I. L. LEWIS.
DISH AND SILVERWARE DRAINER.
APPLICATION FILED NOV. 23, 1916.

1,270,631.

Patented June 25, 1918.

INVENTOR
Isabel L. Lewis
BY
Parsons & Bodell
ATTORNEYS

UNITED STATES PATENT OFFICE.

ISABEL L. LEWIS, OF SYRACUSE, NEW YORK.

DISH AND SILVERWARE DRAINER.

1,270,631.          Specification of Letters Patent.     Patented June 25, 1918.

Application filed November 23, 1916. Serial No. 133,030.

*To all whom it may concern:*

Be it known that I, ISABEL L. LEWIS, a citizen of the United States, and a resident of Syracuse, in the county of Onondaga and State of New York, have invented a certain new and useful Dish and Silverware Drainer, of which the following is a specification.

This invention has for its object a dish and silverware drainer in which a supplemental basket or receptacle can be readily attached to the main basket or receptacle so that it hangs within the main basket of the drainer or on the outside thereof, and in both instances stands horizontally.

The invention consists in the novel features hereinafter set forth and claimed.

In describing this invention, reference is had to the accompanying drawings in which like characters designate corresponding parts in all the views.

Figure 1:
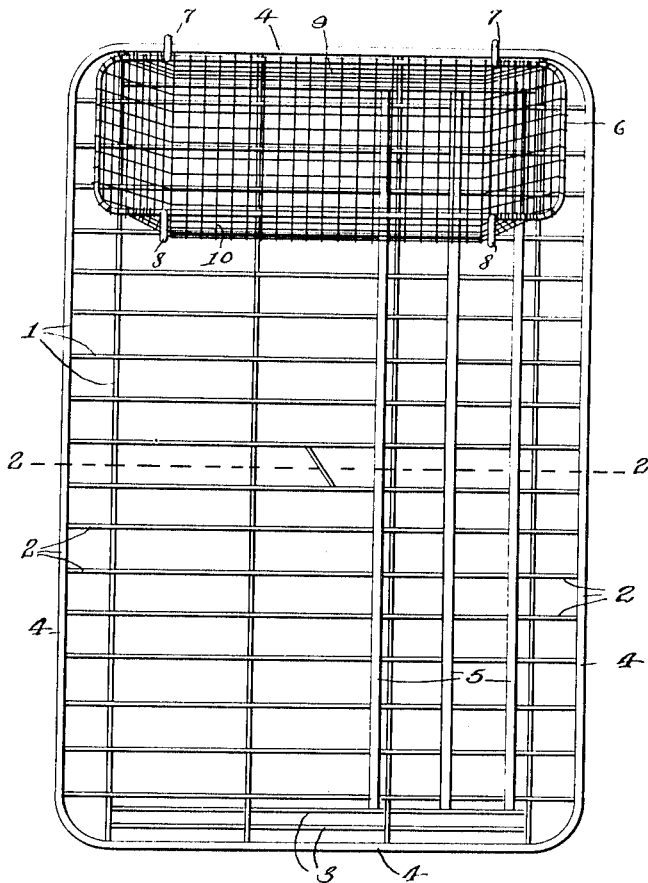
Figure 1 is a plan view of this drainer.
Figure 2:
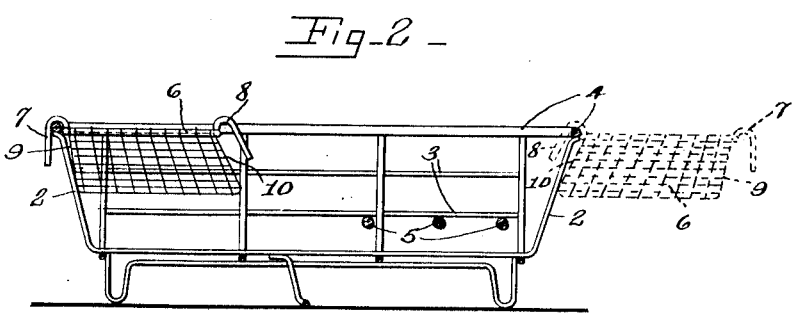
Fig. 2 is a section on the plane of line 2—2, Fig. 1, the supplemental basket being shown in full lines as on the inside of one of the long sides of the main basket, and in dotted lines, as on the outside of the other of the long sides of the basket.

1 designates the main basket or receptacle which is preferably formed of open work as wire, the basket being in the form of a shallow tray having upwardly and outwardly inclined side and end walls 2, 3. A rod or wire 4 extends around the upper edge of said walls. The basket is also provided with rods 5 extending in parallel directions between opposing walls of the basket and supported at their ends by said walls, these rods being here shown as extended lengthwise above the bottom thereof and as supported by the end walls 3.

The rods 5 are for the purpose of supporting plates, saucers, and other dishes in upright positions.

6 is a supplemental basket or receptacle for silverware which is attachable to the main basket to hang from the upper edge thereof within the basket or on the outside of the basket, the supplemental basket having means by which it stands substantially level or horizontal in either of said positions.

The supplemental basket 6 is provided with suitable means for attaching it to the walls of the main basket and, as here shown, is provided with hooks 7, 8 on different sides thereof which hooks 7, 8 hook over the wire or rod 4 around the upper edge of the side walls 2, 3 of the main basket.

In order that the supplemental basket 6 may hang level in either position, two of its walls are inclined one upwardly and outwardly, and the other upwardly and inwardly, and as here shown, opposite lengthwise walls thereof are inclined in parallel planes, one wall 9 inclining upwardly and outwardly, and the other wall 10, upwardly and inwardly. Thus, when the supplemental basket 6 is located within the main basket 1 and the hooks 7 at the top of the wall 9 are engaged with the rod or wire 4, the wall 9 of the supplemental basket rests on the inner face of one of the side and end walls 2, 3 of the main basket and holds the supplemental basket in horizontal position.

Likewise, when the supplemental basket 6 is arranged on the outside of the main basket 1 with the hooks 8 at the upper edge of the wall 10 engaged with said rod or wire 4, said wall 10 engages the outer face of the upwardly and outwardly inclined side walls 2 or 3, of the main basket and holds the supplemental basket in horizontal position.

What I claim is:

1. A dish and silverware drainer comprising a main basket having outwardly and upwardly inclined side walls, and a supplemental basket having means for attachment to the said walls above the bottom of the basket and a portion thereof arranged to hold the supplemental basket horizontal when attached to an inclined wall of the main basket on the inner side of said wall and when attached to said inclined wall on the outer side thereof, substantially as and for the purpose described.

2. A dish and silverware drainer comprising a main basket having an outwardly and upwardly inclined side wall, and a supplemental basket having means for attachment to the upper edge of said inclined wall, and also having a wall inclined upwardly and outwardly and a wall inclined upwardly and inwardly and arranged to lie respectively against the inner and outer faces of the inclined wall of the main basket when the supplemental basket is supported by said wall of the main basket inside and outside of the main basket respectively, substantially as and for the purpose specified.

3. A dish and silverware drainer comprising a main basket having outwardly and upwardly inclined side walls, and a supplemental basket having means for attachment to the upper edge of said walls, the supplemental basket having opposing walls inclined in parallel planes, one of said inclined walls being arranged to rest on the inner side of one of the walls of the main basket when the supplemental basket is supported within the first-mentioned basket and the other of the opposing walls of the supplemental basket being arranged to rest against the outwardly and upwardly inclined outer face of one of the walls of the main basket when the supplemental basket is supported on the outside of the main basket, substantially as and for the purpose set forth.

In testimony whereof, I have hereunto signed my name, at Syracuse, in the county of Onondaga, and State of New York, this 21 day of November, 1916.

ISABEL L. LEWIS.